W. J. LANE.
HORSE-RAKE.
No. 171,734. Patented Jan. 4, 1876.
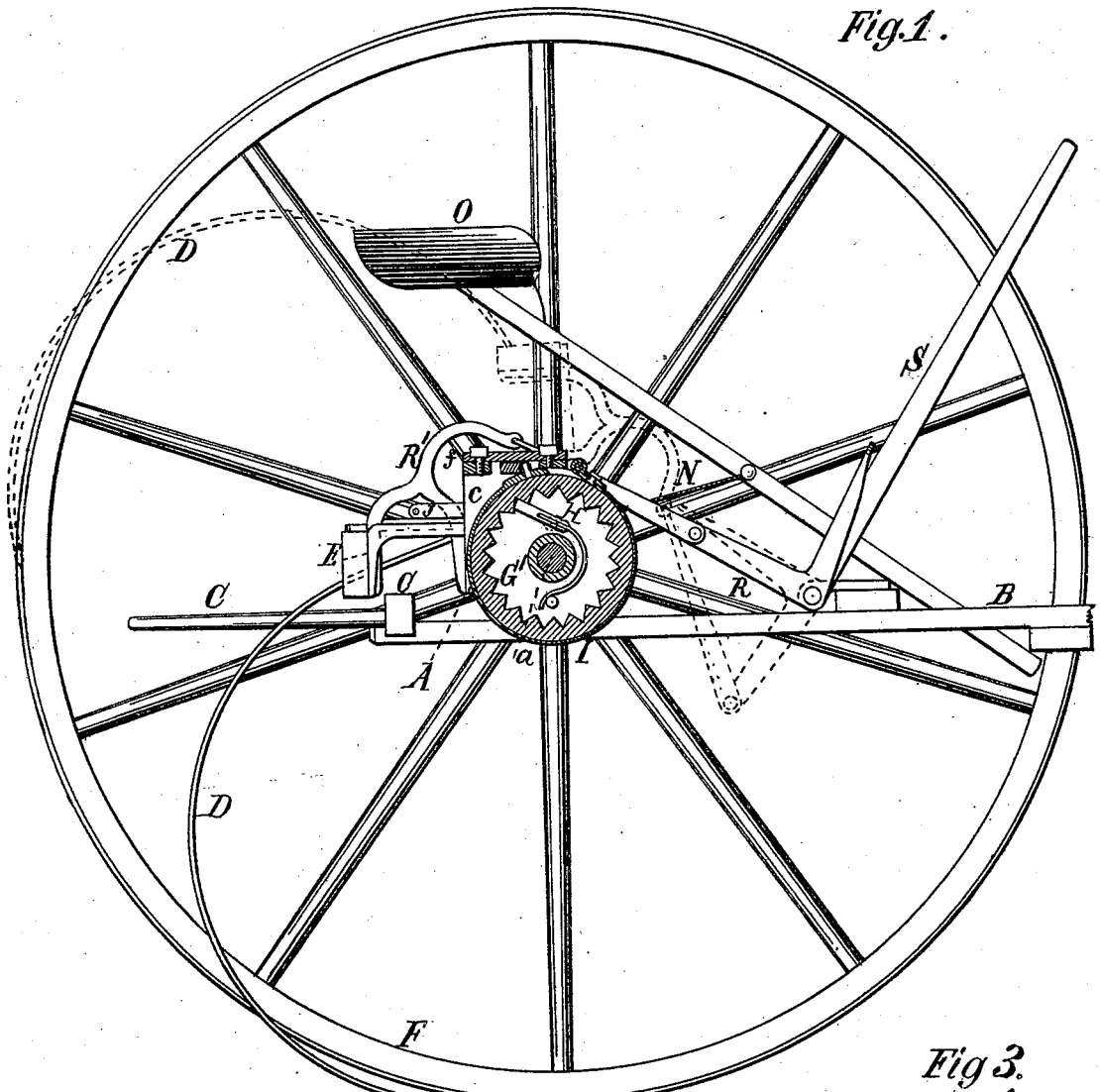
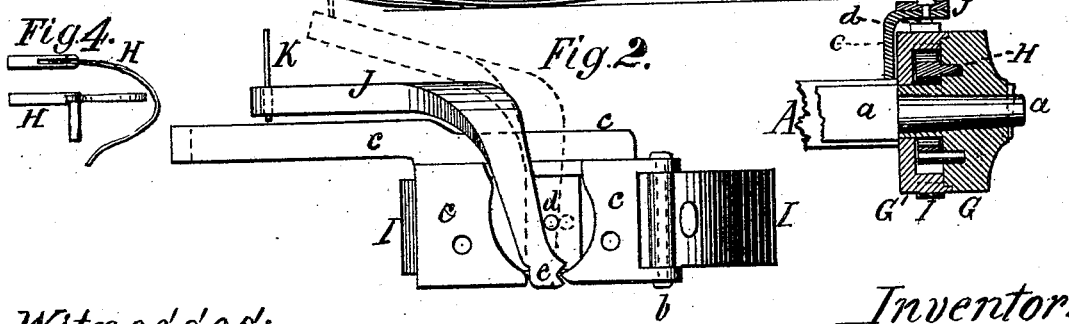

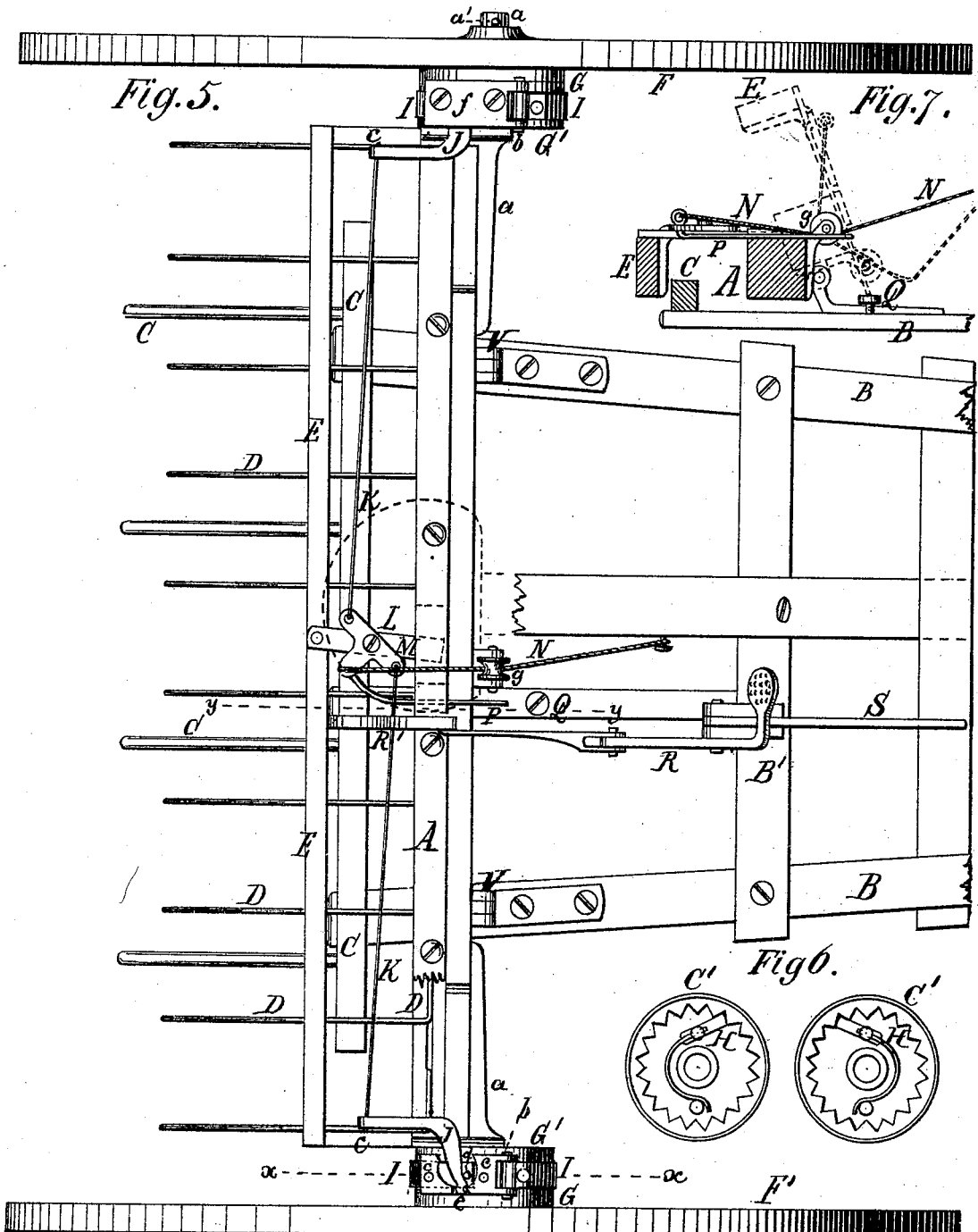
W. J. LANE.
HORSE-RAKE.
No. 171,734. Patented Jan. 4, 1876.
2 Sheets—Sheet 2.

UNITED STATES PATENT OFFICE.

WILLIAM J. LANE, OF MILLBROOK, ASSIGNOR TO RICHARD CARPENTER, JR., AND WILLIAM H. FIELD, OF PORT CHESTER, NEW YORK.

IMPROVEMENT IN HORSE-RAKES.

Specification forming part of Letters Patent No. 171,734, dated January 4, 1876; application filed September 3, 1875.

*To all whom it may concern:*

Be it known that I, WILLIAM J. LANE, of Millbrook, county of Dutchess and State of New York, have invented a new and useful Improvement in Horse Hay-Rakes; and I do hereby declare that the following is a full, clear, and exact description thereof, reference being had to the accompanying drawings, making part of this specification, in which—

Figure 1 is a vertical longitudinal section in the line $x\,x$ of Fig. 5. Fig. 2 is an enlarged top view of one of the frictional compression-straps, its bracket, and the lever by which it its operated. In this view the top plate of the bracket is removed to show the parts more plainly. Fig. 3 is a section of one of the hubs and ratchets and frictional compression-strap. Fig. 4 shows an edge and top view of one of the pawls used with a ratchet of the hub. Fig. 5 is a top view of the rake with a portion broken away near one of the frictional compression-straps. Fig. 6 shows the two ratchets and pawls of the hub. Fig. 7 is a detail longitudinal section in the line $y\,y$ of Fig. 5. Fig. 8 is a modification of the compensating device used between the levers of the frictional compression-straps.

The nature of my invention consists in certain constructions and combinations of parts, as hereinafter described and specifically claimed, whereby the following objects are secured, viz., first, the hand-lever retains its normal position while the rake is being operated as a self-dumping implement, and yet it is available as a hand-lever for dumping the rake; second, the frictional compression-straps, which bring the rake-head into gear with the rotary portion of the carriage, are applied and operated in a much simpler and more effective manner; third, the height to which the rake-teeth are raised is regulated, and undue strain upon the frictional compression-straps and mechanism which operates them avoided, and any difference in the length of the connecting-rods is compensated for by a vibrating pivot-plate or support, as will be more fully described; fourth, the head of the rake is hinged to the shafts with the hinges in a straight line with the centers of the carriage-wheels, and the center of gravity of the rake-head is behind its point of support, and its weight assists the teeth in dropping promptly when ungeared from the carrying-wheels.

To enable others skilled in the art to make and use my invention, I will proceed to describe the same with reference to the drawings.

A is the rake-head made of wood. To the front of this head at each end short metal axle-arms $a\,a$ are firmly fastened. B B are the shafts hinged at V to the front of the rake-head and extended back under the axle far enough to receive on their ends the clearer C. The hinges V V, on which the rake-head swings, are in line with the centers of the axle-arms. D D are the rake-teeth, fastened in a well-known manner to the top of the rake-head, so as to articulate singly, independently of the head, and to rise and fall with the head when it is vibrated. E is the ordinary slotted lifting and holding-down bar, through which the rake-teeth are passed. This bar is fastened rigidly by means of side bars, to the rake-head. F F are the carriage-wheels, formed, respectively, with hubs G G'. These wheels are fitted upon the axle-arms $a\,a$, and confined by pins $a'$. The parts G' of the hubs fit loosely upon the parts G G, and are geared with the same by V-shaped ratchet-teeth on the inner periphery of the parts G' and spring-pawls H H, which are attached to the faces of the parts G G, as shown by Figs. 3 and 6 of the drawings. This construction of the hub gives the wheels a long bearing upon the arm, affords all the advantages resulting from the use of ratchets on the drive-wheels, and at the same time presents the necessary and proper friction-surface for the frictional compression-straps to bear against when the rake is to be raised for the purpose of dumping its load. I I are the frictional compression-straps. One end of each of these straps is hinged at $b$ to a metal bracket, $c$, of the rake-head, and the other end is carried round the part G' of the hub of a wheel, F, and passed under the said bracket and retained by means of a pin, $d$, which is fastened in the strap, and an elbow-lever, J, which is loosely fitted by a knuckle-joint, $e$, to the bracket. The levers J J of the straps are alike, and are kept in place by means of screw-cap plates f, as shown.

K K are rods extending from the elbow-levers J J to a double bell-crank lever, L, which is pivoted to a vibrating bed-piece, M, on the rake-head and lifting-bar E. N is a cord attached to the third arm of the lever L, and carried forward over the rake-head, and under a pulley, g, and fastened to the standard of the driver's seat O, or to a portion of the frame.

Instead of having the bed-piece M to vibrate, this bed-piece may be slotted, as in Fig. 8, and the pin of the lever L may be allowed to play in the slot of the bed-piece. The object of having the bed-piece to vibrate is to equalize the pull upon the rods K K and levers J J, in the event of the rods becoming unequal in length from any cause.

P is a rod attached loosely to the third arm of the lever, and, in this instance, forming the eye for the cord N to attach to. This rod extends forward over the rake-head, under the strip which fastens the teeth to the rake-head, as shown. Q is a stop placed in line with the rod P, and made adjustable by a screw-thread on its lower end. R is a jointed foot-lever or handle, connected to the rake-head by a goose-neck bracket, R', and pivoted to a cross-bar, B', of the frame or shafts. S is a hand-lever fastened to this cross-bar by the same pivot that the foot-lever vibrates upon. This hand-lever is placed forward of the foot-lever or treadle, and is not moved when the rake is dumped by the draft of the team, and therefore no inconvenience from this lever accidentally striking the driver when the load is being dumped by the draft of the team is experienced.

The operation is as follows: The driver depresses the cord N with his foot, and thereby causes the bell-crank L to vibrate and draw the rods K K and ends of the levers J J, to which the rods are attached, toward the center of the carriage. This action causes the frictional compression-straps I I to bind firmly upon the parts G' G' of the hubs of the wheels. This binding action causes the parts G' G' to become geared with the rake-head, while the parts G G are caused to remain in gear with the parts G' G' by the spring-pawls, and thus, as the wheels revolve, the rake-head, hubs, and wheels turn together as long as the driver keeps his foot upon the cord.

When the load has been dumped, the driver withdraws his foot from the cord, and the rake falls by its gravity. The extent of the elevation of the rake-head is controlled by the end of the rod P striking against the stop Q, as illustrated in Fig. 7. While the rake-teeth are gathering hay the driver holds them down by placing his foot against the foot-lever or treadle R.

If it is desired to dump the load by hand, the driver pulls the hand-lever toward him, and this lever, in moving, strikes the foot-treadle, and carries it along, and causes the jointed leverage of this treadle to raise the rake-head.

It will be evident that the knuckle-joint connections e of the levers J J insure a more direct pull upon the frictional compression-straps; also that the vibrating bed-piece, or its equivalent, makes the pull upon the straps uniform, and that the two ratchets, with teeth shaped as shown, and provided with removable pawls, will avoid much inconvenience in the setting up of the machine for use.

The pawls, as shown in the drawings, are formed with pins on them, which are inserted loosely into sockets of the parts G G' of the hubs, and these pins can be readily withdrawn, and the pawls reversed, as occasion requires; and both of the wheels being provided with ratchets and pawls, the draft of the team can be employed for elevating the rake-head while the machine is turning around corners.

It will further be seen that many serious accidents will be avoided by having the hand-lever arranged to perform its usual office when required, and yet not influenced when the rake is being dumped by the power of the team; and also that the stop device will save the machinery from much unnecessary strain, for the rake-head can only fall over a certain distance after being raised, and any increased pressure of the foot upon the cord will not be liable to cause the double bell-crank to influence or act upon the compression-straps.

Further, the axle-arms a and hinges V are applied in a rake which is dumped by the draft of the team, and in which the axle and rake-teeth are carried by the head in a new way, viz: both are in the same straight line, and the head is enabled to oscillate freely at all times without being influenced by the hinges, either by the draft of the team or weight of the driver or shafts; and while this is the case the center of gravity of the head will at all times be behind its point of support, and its weight will assist the teeth in dropping, when ungeared, from the carrying-wheels.

What I claim is—

1. The combination of the hubs G G', each provided with a ratchet and pawl, frictional compression-straps I I, elbow-levers J J, rods K K, vibrating lever L, and cord N, substantially as and for the purpose described.

2. The lever J, connected to the bracket of the frictional compression-strap I, by a knuckle-joint, e, and bearing, by a forward pull, against a pin, d, in the end of the said strap, substantially as and for the purpose herein described.

3. The equalizing or compensating device M, in combination with the rods K K, levers J J and L, substantially as and for the purpose set forth.

4. The rod P and positive stop Q, for controlling the extent of the elevation of the rake-head, and relieving the compression-straps and intermediate mechanism, substantially as described.

5. The hand-dumping lever S, applied in the relation specified, to the foot treadle or lever R, in combination with a rake-head, provided with mechanism which will, when brought into use, enable the draft of the horse or team to raise the teeth and dump the load without moving said hand-lever along with the foot-lever or treadle, substantially as described.

WILLIAM J. LANE.

Witnesses:
H. T. TRIPP,
RICHARD CARPENTER, Jr.